United States Patent [19]

Levy

[11] Patent Number: 4,779,212

[45] Date of Patent: Oct. 18, 1988

[54] DISTANCE MEASURING DEVICE

[76] Inventor: Nessim I. Levy, 13 Habrosh Street, Savyon, Israel

[21] Appl. No.: 893,644

[22] Filed: Aug. 6, 1986

[30] Foreign Application Priority Data

Sep. 27, 1985 [IL] Israel .................................. 76517

[51] Int. Cl.⁴ ............................................ G01B 21/04
[52] U.S. Cl. ...................... 364/562; 33/138; 33/139; 33/140; 33/142; 364/561; 377/17; 377/18
[58] Field of Search ............... 33/1 CC, 137, 138, 139, 33/140, 142; 364/561, 562; 377/17, 18

[56] References Cited

U.S. PATENT DOCUMENTS

| | | | |
|---|---|---|---|
| 3,780,440 | 12/1973 | Taylor | 33/139 |
| 4,181,959 | 1/1980 | Tateishi | 33/138 X |
| 4,213,035 | 7/1980 | Washizuka et al. | 364/562 |
| 4,242,574 | 12/1980 | Grant | 377/18 |
| 4,495,583 | 1/1985 | Punater | 377/18 X |
| 4,506,336 | 3/1985 | Hird | 364/561 X |
| 4,575,944 | 3/1986 | Lin | 33/138 |

Primary Examiner—P. S. Lall
Assistant Examiner—Edward R. Cosimano
Attorney, Agent, or Firm—Benjamin J. Barish

[57] ABSTRACT

A distance-measuring device, comprises a housing; a flexible measuring tape reelable into and out of the housing for measuring lengths; a shaft encoder rotatable by the flexible-measuring tape when reeled into and out of the housing and outputting digital pulses for each unit length of the measuring tape so reeled into or out of the housing; and an up/down counter adding the electrical pulses outputted when the tape is reeled out of the housing, and subtracting the electrical pulses outputted when the tape is reeled into the housing, and thereby providing an indication of the length of the measuring tape reeled out of said housing. Also described is a device for measuring the two coordinates of a point in space, by providing two such housings mounted on a common base, and a flexible measuring tape reelable into and out of each housing at locations spaced a predetermined distance between the two housings, the two tapes being connected at a single connection point whose coordinates are to be determined.

4 Claims, 1 Drawing Sheet

DISTANCE MEASURING DEVICE

BACKGROUND OF THE INVENTION

The present invention relates to distance-measuring devices, e.g., for measuring length and other distances where the conventional measuring tape is now used. The invention can also be used for measuring distances in two or more coordinates by using a plurality of such devices.

The conventional distance-measuring device includes a tape which is reelable into and out of a housing and which carries markings graduated in dimensions of distance to provide a measurement of the length of the tape reeled out of the housing. The measurements made by such tapes are not highly accurate because of the relatively larger tolerances inherent in the graduation markings, nor are they conveniently readable because of the need to observe the graduation markings.

An object of the present invention is to provide a distance-measuring device which inherently is more accurate and more convenient to use. Another object of the invention is to provide a distance-measuring device which can also measure distances in two or more coordinates.

SUMMARY OF THE INVENTION

According to a broad aspect of the present invention, there is provided a distance-measuring device comprising: a housing; a flexible measuring tape reelable into and out of the housing for measuring lengths; a shaft encoder rotatable by the flexible-measuring tape when reeled into and out of the housing, and outputting digital pulses for each unit length of the measuring tape so reeled into or out of the housing; and an up/down counter adding the electrical pulses outputted when the tape is reeld out of the housing, and subtracting the electrical pulses outputted when the tape is reeled into the housing, and thereby providing an indication of the length of the measuring tape reeled out of the housing.

Preferably, the device further includes a display for displaying the contents of the counter.

The foregoing features of the invention enable compact, portable, distance-measuring devices to be constructed in which the measurements produced are highly precise and are also conveniently readable by the user.

According to another embodiment of the invention, two such devices are provided each including a flexible measuring tape reelable into and out of its respective housing at locations spaced a predetermined distance between the two housings, the two tapes being connected together at a single connection point, each housing including an encoder coupled to one of the measuring tapes to output pulses for each unit length its respective measuring tape is reeled into or out of the housing, and a computer receiving said pulses from the two encoders for computing the coordinates of the connection point of the two measuring tapes.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
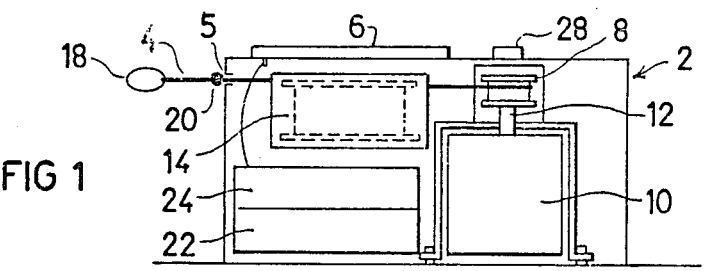
FIG. 1 is a side view illustrating one from of distance-measuring device constructed in accordance with the present invention.
Figure 2:
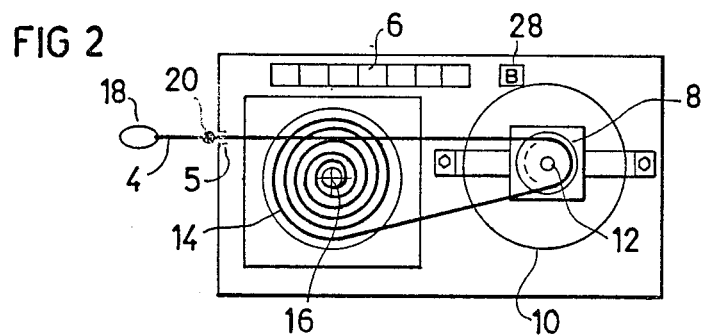
FIG. 2 is a top plan view of the device of FIG. 1.
Figure 3:
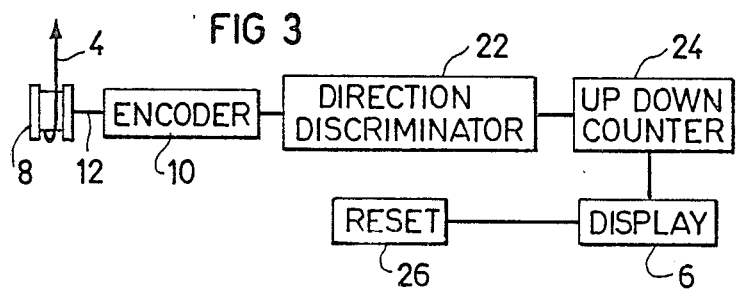
FIG. 3 is a block diagram illustrating the main electrical components in the device of FIGS. 1 and 2.

The distance-measuring device illustrated in FIGS. 1-3 comprises a housing 2 and a flexible measuring tape 4 reelable in and out of the housing through an opening 5 therein for measuring lengths, as in a conventional mechanical-type measuring tape. In this case, however, the lengths are measured by an electronic measuring system and are indicated by an electronic digital display 6.

For this purpose, housing 2 further includes a drum 8 on which the flexible measuring tape 4 is wound, and an encoder 10 mechanically coupled to the drum by a shaft 12 so that the encoder is rotated with the drum. Drum 8 is spring-urged in the direction of reeling the measuring tape 4 into the housing, to the postion illustrated in FIGS. 1 and 2, by coil spring 14 having one end secured to the inner end of the tape 4, and the opposite end anchored at 16 to the housing. Tape 4 further includes a finger-gripping member 18 at its outer end to facilitate gripping and pulling of the tape from the housing, and an enlargement 20 engageable with the edges of the opening 5 in the housing through which the measuring tape passes, to limit the inward displacement of the measuring tape by the coil spring 14.

Encoder 10 may be a known shaft encoder which outputs digital pulses for each unit of rotation of shaft 12, and therefore for each unit of length of the measuring tape 4 reeled out of or into the housing 2. For example, the shaft encoder may be of the known electro-optical type, wherein a beam of light is projected onto graduation markings on the shaft whose rotation is being encoded, which beam of light is reflected back to a photocell to produce the digital pulses. Another known type of shaft encoder which may be used includes magnetic markings on the shaft whose rotation is being encoded; and a still further known type of encoder includes conductive elements engageable by brushes to produce the digital pulses.

The electrical system disposed within housing 2 further includes a direction discriminator 22 which discrimintaes the direction of rotation of shaft 12, and thereby the direction of movement of the tape 4. Such discriminators are also know, producing a signal of one sign when shaft 12 rotates in one direction, and a signal of the oposite sign when the sharft rotates in the opposite direction.

Housing 2 further includes an up/down counter 24 for registering the electrical pulses outputted by the shaft encoder 10. The contents of the counter are fed to the digital display 6, such that the value displayed therein will be a measurement of the length of the measuring tape 4 reeled out of the housing 2. Counter 24 may be reset by a resetting circuit 26 operated by a push button 28 (FIG. 2) manipulatable by the user.

The operation of the device illustrated in FIGS. 1-3 will be apparent from the above description. Thus, the measuring tape 4 is normally fully retracted within the housing by the coil spring 14, as shown in FIGS. 1 and 2, whereupon counter 24 and display 6 both read "0". In order to produce a measurement, the enlarged head 18 of the measuring tape 4 is grasped, and the tape is pulled out of the housing, against the bias of spring 14, to the desired length for making the measurement. As the measuring tape 4 is pulled out of the housing, it rotates drum 8 over which it is wound, which drum in turn rotates shaft 12. The magnitude of rotation of shaft 12 is measured by encoder 10 which outputs a digital pulse for each unit length of the measuring tape 4 reeled out of the housing. The pulses outputted by encoder 10 are fed to the up/down counter 24 which, under the control of the direction discriminator 22, counts-up when tape 4 is reeled out of the housing, and counts-down when the tape is reeled back into the housing. Thus, the count accumulated within counter 24 is a measurement of the length of tape 4 pulled out of the housing from its initial position. This measurement is fed to and displayed in the digital display 6.

Counter 24 may be zeroized to prevent an accumulation of errors in the course of time by pressing reset button 28 which causes reset circuit 26 to reset the counter. As an alternative, resetiing may also be effected automatically by enlargement 20 on the end of this tape engaging a switch (not shown) at opening 5 when the tape is completely reeled into the housing.

It will thus be seen that the distance-measuring device illustrated in FIGS. 1–3 may be constructed in the form of a compact and portable unit providing measurements of high accuracy and convenient readability.

Figure 4:
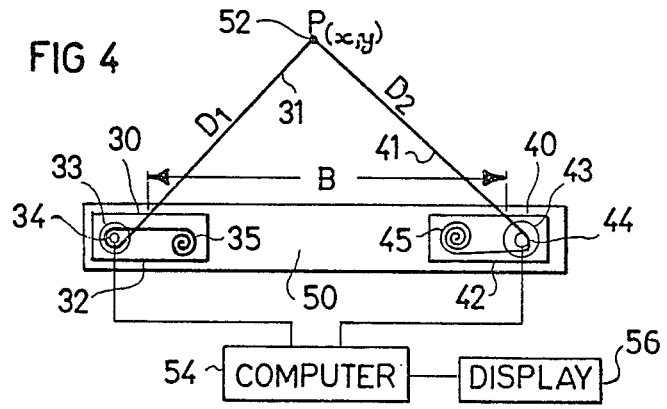
FIG. 4 schematically illustrates apparatus constructed in accordance with the present invention including two of the devices illustrated in FIGS. 1-3 for measuring a point along two coordinates.

FIG. 4 illustrates a distance-measuring device including two of the FIGS. 1–3 units arranged so as to be used for measuring the location of a point in two coordinates. Thus, the measuring device illustrated in FIG. 4 comprises two units 30, 40 mounted on a common base 50. Each unit includes a flexible measuring tape 31, 41 reelable into and out of its respective housing 32, 42 through slots at the opposite ends of the housing, corresponding to slot 5 in FIGS. 1 and 2. The two tapes are connected together at point 52, which point is the one to be located in two coordinates.

Each tape 31, 41 is wound over a drum, as shown at 33, 43. Each drum rotates a shaft encoder 34, 44 against the bias of a coil spring 35, 45 such that each of the two encoders outputs an electrical pulse for each unit length of displacement of its respected tape. The outputs of the two encoders 34, 44 are fed to a computer 54 which makes the necessary computations to produce the required measurements, and then outputs the measurements to a digital display 56.

It will thus be seen in the measuring device illustrated in FIG. 4, point 52 may be moved in accordance with the measurement desired. The length $D_2$ of tape 41 reeled out of the housing of unit 40 will be indicated by the output of shaft decoder 44. Since the dimension B between the exit points of the two tapes is a known parameter, it will be seen that the device produces sufficient information to enable the computer 54 to make the necessary computations of point 52 in both the X-coordinate and in the Y-coordinate $P(x,y)$ by solving the triangle $D_1$, $D_2$ and B which are all of known lengths.

It will be appreciated that in both described embodiments, the flexible measuring tape (4 in FIGS. 1–3, and 31, 41 in FIG. 4) may take other forms, such as wires, cables, or other elongated flexible members, and therefore, the term "tape" is intended to comprehend all these equivalents It will also be appreciated that three of the described units may be used, similar to the arrangement illustrated in FIG. 4 but arranged in three dimensions, to compute the coordinates of a point in three dimensions.

Many other variations, modifications and applications of the invention will be apparent.

What is claimed is:

1. A distance-measuring device, comprising: two housings mounted on a common base; a flexible measuring tape reelable into and out of each of said housings at locations spaced a predetermined distance between the two housings, means connecting the two tapes at a single connection point identifiable by two orthogonal coordinates; each of said housings further including a shaft encoder rotatable by its flexible-measuring tape when reeled into and out of its housing and outputting digital pulses for each unit length of the measuring tape so reeled into or out of its housing; and a computer for receiving said electrical pulses and computing thereby the two coordinates of said connection point of the two measuring tapes.

2. The device according to claim 1, further including a display for displaying the coordinates computed by said computer.

3. The device according to claim 1, wherein each of said housings further includes a drum on which its respective flexible measuring tape is wound and which is rotated during the reeling of the tape into or out of its respective housing; means coupling each drum to its respective shaft encoder to rotate same during the reeling of the respective measuring tape into and out of its housing.

4. The device according to claim 3, wherein each of said drums is spring-biassed in the direction of reeling its respective measuring tape into its housing.

* * * * *